US008515079B1

(12) United States Patent
Asati et al.

(10) Patent No.: US 8,515,079 B1
(45) Date of Patent: Aug. 20, 2013

(54) HYBRID REKEY DISTRIBUTION IN A VIRTUAL PRIVATE NETWORK ENVIRONMENT

(75) Inventors: Rajiv Asati, Morrisville, NC (US); Mohamed Khalid, Cary, NC (US); Aamer Akhter, Cary, NC (US); Brian Weis, San Jose, CA (US); Shashi Sastry, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 1399 days.

(21) Appl. No.: 11/627,637

(22) Filed: Jan. 26, 2007

(51) Int. Cl.
*H04L 29/06* (2006.01)

(52) U.S. Cl.
USPC .......................... 380/279; 380/277; 380/278

(58) Field of Classification Search
USPC ........................................ 380/277, 278, 279
See application file for complete search history.

(56) References Cited

U.S. PATENT DOCUMENTS

| | | | | |
|---|---|---|---|---|
| 5,727,002 A * | 3/1998 | Miller et al. | ................... | 714/748 |
| 7,234,058 B1 * | 6/2007 | Baugher et al. | ............... | 713/163 |
| 7,234,063 B1 * | 6/2007 | Baugher et al. | ............... | 713/189 |
| 2003/0188188 A1 * | 10/2003 | Padmanabhan et al. | ...... | 713/201 |
| 2004/0022237 A1 * | 2/2004 | Elliott et al. | ................... | 370/356 |
| 2004/0044891 A1 * | 3/2004 | Hanzlik et al. | ................ | 713/150 |
| 2006/0062384 A1 * | 3/2006 | Dondeti | .......................... | 380/44 |
| 2006/0070115 A1 * | 3/2006 | Yamada et al. | ................... | 726/3 |
| 2007/0206597 A1 * | 9/2007 | Asati et al. | .................... | 370/392 |
| 2007/0211720 A1 * | 9/2007 | Fuchs et al. | ................... | 370/390 |

FOREIGN PATENT DOCUMENTS

WO   WO 2005/032026 A2 *   4/2005

* cited by examiner

*Primary Examiner* — Edan Orgad
*Assistant Examiner* — Bradley Holder
(74) *Attorney, Agent, or Firm* — Hickman Palermo Truong Becker Bingham Wong LLP (57) ABSTRACT

In one embodiment, a rekey distribution process transmits, from a key server, a multicast probe message intended to be received by at least one group member device. The rekey distribution process also receives, at the key server, an acknowledgement message from each group member device that received the multicast probe message. In turn, the rekey distribution process transmits, from the key server, a multicast rekey data message intended to be received by each group member device from which the key server received an acknowledgment message. Furthermore, the rekey distribution process transmits, from the key server, a unicast rekey data message to each group member device from which the key server did not receive an acknowledgment message.

11 Claims, 7 Drawing Sheets

HYBRID REKEY DISTRIBUTION IN A VIRTUAL PRIVATE NETWORK ENVIRONMENT

TECHNICAL FIELD

The present disclosure relates generally to the conveyance of cryptographic rekey information in a virtual private network using multicast and unicast distribution methods.

BACKGROUND

The Internet is a massive network of networks in which computers communicate with each other via use of different communication protocols. The Internet includes packet-routing devices, such as switches, routers and the like, interconnecting many computers. To support routing of information such as packets, each of the packet-routing devices typically maintains routing tables to perform routing decisions in which to forward traffic from a source computer, through the network, to a destination computer. In such networks, Virtual Private Network (VPN) protocols are frequently utilized in day-to-day digital communications. Virtual private networks are secure communication systems spread across a large network environment (e.g., the Internet), and are often used within a company, or by several organizations, to transfer data confidentially over a publicly accessible network. VPN message traffic can be propagated over a public networking infrastructure on top of standard protocols (e.g., multi-protocol label switching "MPLS"), or over a service provider's private network with a defined Service Level Agreement (SLA) between the VPN customer and the VPN service provider.

Enterprises have been rapidly deploying VPN networks using site-to-site models such as Dynamic Multipoint VPN (DMVPN) or Global Key VPN (GKVPN, also referred to as Group Key VPN) technologies. The GKVPN framework is typically implemented in the form of secured multicast or Dynamic Group VPN (DGVPN) technologies. Generally, such conventional VPN architectures include a key server that manages the deployment of group keys (e.g., rekey data) within the VPN to authorized VPN participants, or group members. As such, conventional key server protocols provide for various means of updating and distributing group keys within a dynamic VPN network.

BRIEF DESCRIPTION OF THE DRAWINGS

The foregoing and other objects, features and advantages of the invention will be apparent from the following more particular description of embodiments of Hybrid Rekey Distribution in a VPN Environment, as illustrated in the accompanying drawings and figures in which like reference characters refer to the same parts throughout the different views. The drawings are not necessarily to scale, with emphasis instead being placed upon illustrating the embodiments, principles and concepts of the Hybrid Rekey Distribution in a VPN Environment.

DETAILED DESCRIPTION

Overview

Generally, embodiments disclosed herein provide a rekey distribution process that transmits, from a key server, a multicast probe message to determine, inter alia, the availability of at least one group member device. The rekey distribution process then receives, at the key server, an acknowledgement message from each group member device that received the multicast probe message. In response, the rekey distribution process transmits, from the key server, a multicast rekey data message intended to be received by each group member device that the key server received an acknowledgment message from. Furthermore, the rekey distribution process transmits, from the key server, a unicast rekey data message to each group member device that the key server did not receive an acknowledgment message from.

In an alternate embodiment, a rekey distribution process transmits, from a key server, a multicast probe message to determine, inter alia, the availability of at least one group member device. In response to receiving the multicast probe message, the rekey distribution process transmits, from each group member device that is capable of receiving the multicast message, an acknowledgment message to the key server. The rekey distribution process then receives, at the key server, an acknowledgement message from each group member device that transmitted the acknowledgment message. In response, the rekey distribution process transmits, from the key server, a multicast rekey data message intended to be received by each group member device that the key server received an acknowledgment message from. The rekey distribution process also transmits, from the key server, a unicast rekey data message to each group member device that the key server did not receive an acknowledgment message from. Furthermore, the rekey distribution process detects, in at least one group member device, a communication anomaly. In response to detecting the communication anomaly, the rekey distribution process transmits, from each group member device that detected the communication anomaly, a negative acknowledgment message to the key server. In one embodiment, the negative acknowledgement message is conveyed in NOTIFY payload of an ISAKMP message(s) that may correspond to group member device's re-registration with the key server. Additionally, the rekey distribution process receives, at the key server, the negative acknowledgment message from each group member device that detected the communication anomaly. In response, the rekey distribution process transmits, from the key server, a unicast rekey message to each group member device that transmitted the negative acknowledgment message. The unicast rekey message may contain the same rekey information that was previously conveyed via the multicast rekey message.

Figure 1:
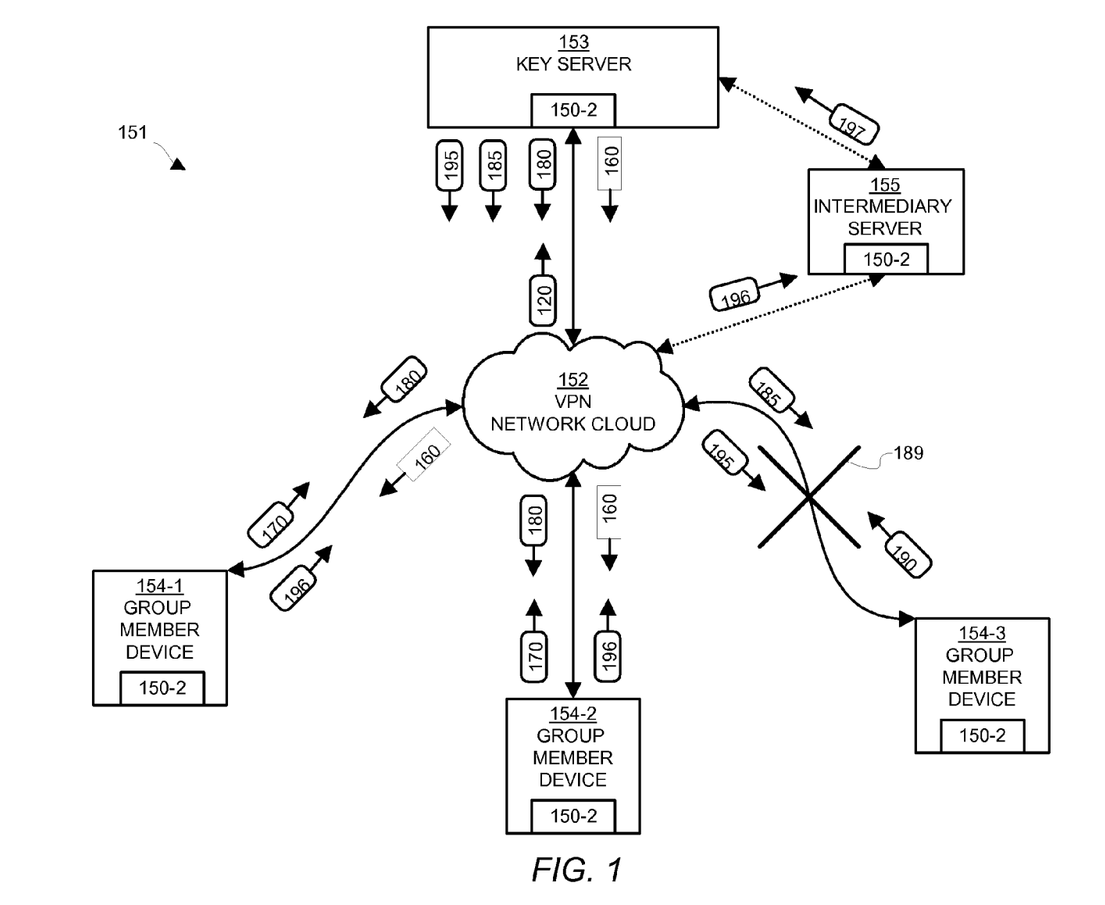
FIG. 1 is a block diagram that illustrates an embodiment of the rekey distribution process when it implements hybrid rekey distribution in accordance with one example configuration.

FIG. 1 depicts an example embodiment of a VPN environment 151 (e.g., GKVPN, DGVPN, Enhanced DMVPN, Secured Multicast, etc.) comprising a key server 153 and multiple group member devices 154-1, 154-2 and 154-3 (hereinafter collectively referred to as group member devices 154). The key server 153 communicates with the group member devices 154 across the VPN network cloud 152. More specifically, the VPN network cloud (e.g., the Internet) consists of various internetworking components and equipment (e.g., routers, gateways, etc.) that are suitable for propagating data through a large network. In addition, FIG. 1 shows an intermediary server 155 that operates as a buffer between the group member servers 154 and the key server 153. It should be noted that the rekey distribution process 150-2 may be instantiated on some or all of the devices shown in FIG. 1 and does not necessarily have to be executed on each device for proper and complete implementation of the methods and steps described below. Details regarding the interoperability of the VPN environment 151 components are discussed below.

Flow charts of the presently disclosed methods are depicted in FIGS. 2 through 6. The rectangular elements are herein denoted "steps" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Figure 2:
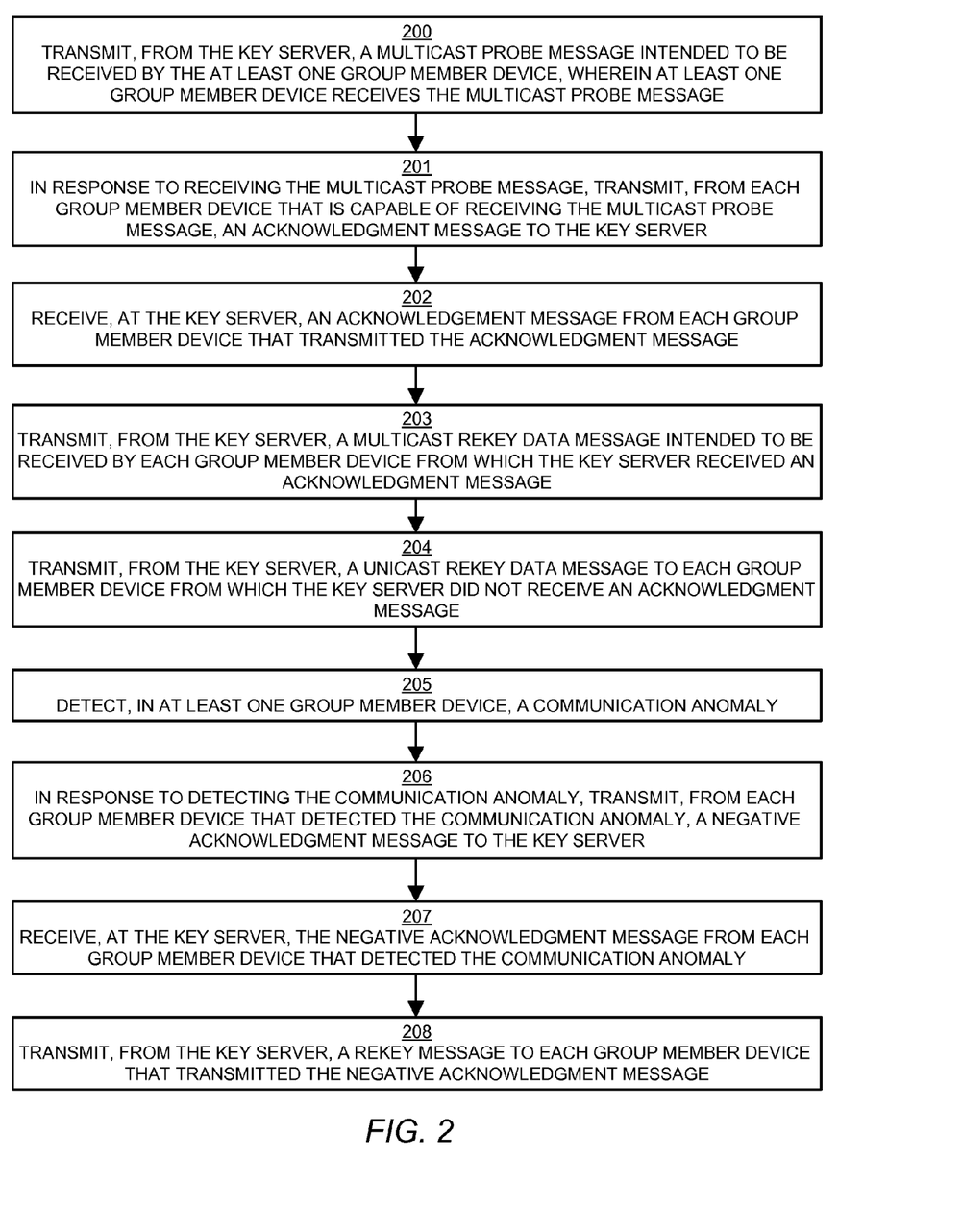
FIG. 2 is a flow chart of processing steps that shows high-level processing operations performed by the rekey distribution process 150-2 when it distributes rekey data in a VPN environment in accordance with one example configuration.

FIG. 2 is a flow chart of processing steps that shows high-level processing operations performed by the rekey distribution process 150-2 when it distributes rekey data in a VPN environment in accordance with one example configuration.

In step 200, the rekey distribution process 150-2 transmits, from the key server 153, a multicast probe message 160 to the at least one group member device 154, wherein at least one group member device (e.g., group member device 154-1) receives the multicast probe message 160. The key server 153 sends multicast probe messages 160 in order to determine whether a multicast tree is set up in the network and to ascertain the group member devices 154 that are capable of receiving multicast messages. In this manner, the multicast probe message 160 is typically a special multicast packet wherein the source address is the address of the key server 153, and the destination address is the multicast group address for the registered group member devices 154. The multicast probe message may also include information such as the time-to-hold-the-response and the like.

In the example embodiment shown in FIG. 1, the key server 153 transmits a multicast probe message 160 to group member devices 154 across VPN network cloud 152. Accordingly, group member devices 154-1 and 154-2 receive the multicast probe message 160 in this example configuration.

In step 201, the rekey distribution process 150-2, in response to receiving the multicast probe message 160, transmits, from each group member device 154 that is capable of receiving the multicast probe message 160, an acknowledgment message 170 to the key server 153. The acknowledgement message 170 alerts the keys server 153 of the group member devices 154 that are capable of receiving multicast message as part of an operational multicast tree in the VPN environment 151. Typically, as in one example embodiment, the group member devices 154 transmit the acknowledgement message 170 to the key server 153 as a unicast message. However, in alternate embodiments the acknowledgement message 170 may be transmitted via multicast or other similar means for conveying data packets across a network. Moreover, the acknowledgement message 170 may be transmitted either immediately or after a predetermined time as per the information retrieved from the previously received multicast payload message.

In the example embodiment of FIG. 1, group members 154-1 and 154-2 send an acknowledgement message 170 to the key server 153 across VPN network cloud 152 in response to receiving the multicast probe message 160. Note that in this example embodiment the group member device 154-3 does not receive the multicast probe message 160 and, consequently, does not transmit an acknowledgement message 170 back to the key server 153.

In step 202, the rekey distribution process 150-2 receives, at the key server 153, an acknowledgement message 170 from each group member device 154 that transmitted the acknowledgment message 170. As previously noted in reference to FIG. 1, the key server 153 receives acknowledgement messages 170 from group members 154-1 and 154-2 as conveyed across the VPN network cloud 152.

In step 203, the rekey distribution process 150-2 transmits, from the key server 153, a multicast rekey data message 180 to each group member device 154 from which the key server 153 received an acknowledgment message 170. The multicast rekey data message 180 is a cryptographic rekey message containing group key information that is sent via a multicast protocol generally known in the art. In the example embodiment depicted in FIG. 1, the key server 153 transmits a multicast rekey data message 180 to group member devices 154-1 and 154-2 across VPN network cloud 152. In an example embodiment, the rekey distribution process 150-2 transmits the multicast rekey data messages 180 and multicast probe messages 160 across VPN network cloud 152 using the same type of messaging format (e.g., same header information, packet configuration, etc.).

In step 204, the rekey distribution process 150-2 transmits, from the key server 153, a unicast rekey data message 185 to each group member device 154 from which the key server 153 did not receive an acknowledgment message 170. Since some group member devices 154 may not be capable of receiving multicast messages (as evidenced by the absence of an acknowledgement message 170 in response to the multicast probe message 160), the key server 153 transmits a unicast rekey data message 185 to those group member devices via a unicast protocol in order to ensure the receipt of rekey information by each group member in the VPN environment 151. As per the example embodiment of FIG. 1, the key server 153 transmits a unicast rekey data message 185 to group member device 154-3 since the key server did not receive an acknowledgement message from group member device 154-3 in response to the multicast probe message 160.

In step 205, the rekey distribution process 150-2 detects, in at least one group member device 154, a communication anomaly 189. Example situations involving the detection of a communication anomaly may include, but are not limited to: the rekey distribution process 150-2 detecting a packet loss during network communications, the rekey distribution process 150-2 detecting that a keep-alive message has not been received, and/or the rekey distribution process 150-2 determining that a time for responding has elapsed since the occurrence of a network event (e.g., non-receipt of rekey information from the rekey server 153 within a predetermined time).

In step 206, the rekey distribution process 150-2, in response to detecting the communication anomaly 189, transmits, from each group member device 154 that detected the communication anomaly 189, a negative acknowledgment message 190 to the key server 153. A group member device 154 transmits a negative acknowledgement message 190 in order to alert the key server 153 that the group member device 154 has detected a communication anomaly 189 (e.g., the non-receipt of timely rekey information within a predetermined time). Assume that in one example embodiment the group member device 154-3 received neither a multicast probe message 160 nor a unicast rekey data message 185. Further assume that the group member device 154-3 detected a communication anomaly 189 (e.g., non-receipt of a keep-alive message). As a result, the group member device 154-3 transmits a negative acknowledgment message 190 to the key server 153 across VPN network cloud 152 in accordance with the example embodiment of FIG. 1. In an example embodiment, the negative acknowledgement message 190 is conveyed (e.g., by the group member device 154-3) in a new NOTIFY payload of the ISAKMP message that is used as the means to register with key server 153.

In step 207, the rekey distribution process 150-2 receives, at the key server 153, the negative acknowledgment message 190 from each group member device that detected the communication anomaly 189.

In step 208, the rekey distribution process 150-2 transmits, from the key server 153, a rekey message 195 to each group member device 154 that transmitted the negative acknowledgment message 190. Generally, the rekey message 195 comprises up-to-date rekey information regarding the current cryptographic status of the VPN environment 151. In the example embodiment of FIG. 1, the rekey server 153 transmits a rekey message 195 to group member device 154-3 across VPN network cloud 152 in response to receiving the negative acknowledgment message 190 from group member device 154-3. Thus, group member device 154-3 is updated with the most current rekey information associated with the VPN environment 151.

Figure 3:
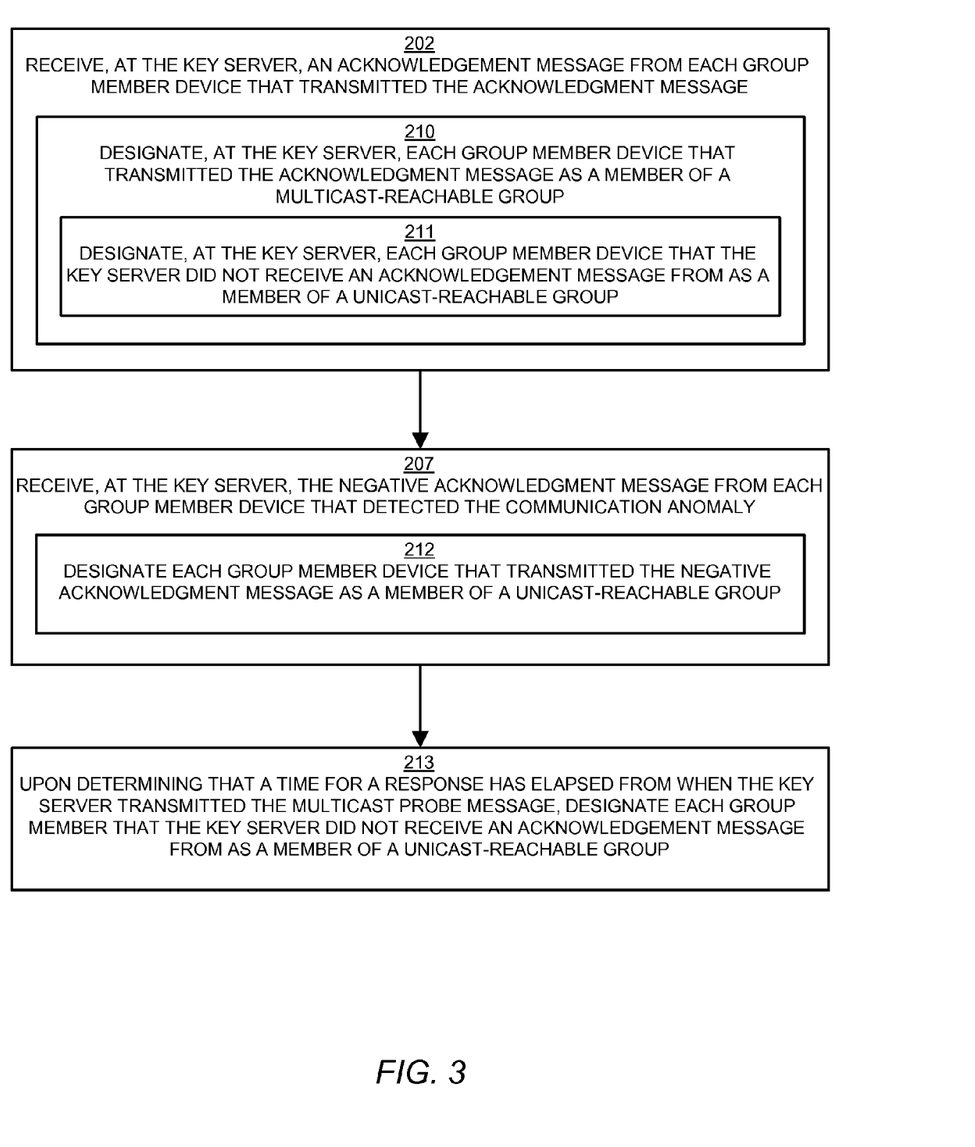
FIG. 3 is a flow chart of processing steps that shows high-level processing operations performed by the rekey distribution process 150-2 when it distributes rekey data in a VPN environment in accordance with one example configuration.

FIG. 3 is a flow chart of processing steps that shows high-level processing operations performed by the rekey distribution process 150-2 when it distributes rekey data in a VPN environment in accordance with one example configuration.

In step 210, the rekey distribution process 150-2 designates, at the key server 153, each group member device 154 that transmitted the acknowledgment message 170 as a member of a multicast group. Stated differently, the multicast group comprises group member devices 154 that are capable of receiving multicast data as evidenced by the response (e.g., acknowledgement message 170) to the multicast probe message 160. As such, the rekey distribution process 150-2 sends out the multicast rekey data message 180 to group member devices 154 contained within the multicast group. In the example embodiment depicted in FIG. 1, the rekey server 153 designates group member devices 154-1 and 154-2 as members of the multicast group since the rekey server 153 received acknowledgement messages 170 from those group member devices.

In step 211, the rekey distribution process 150-2 designates, at the key server 153, each group member device 154 that the key server 153 did not receive an acknowledgement message 170 from as a member of a unicast group. In other words, the unicast group comprises group member devices 154 that are not capable of receiving multicast data as evidenced by the non-receipt of an acknowledgement message 170 in response to the multicast probe message 160. As shown in the example embodiment of FIG. 1, the rekey server 153 designates group member device 154-3 as a member of the unicast group since the rekey server 153 did not receive an acknowledgement message 170 from group member device 154-3. As a member of the unicast group, the key server 153 will transmit a unicast rekey data message 185 to group member device 154-3 in order to ensure the receipt of up-to-date rekey information at group member device 154-3.

In step 212, the rekey distribution process 150-2 designates each group member device 154 that transmitted the negative acknowledgment message 190 as a member of the unicast group. To guarantee the timely receipt of up-to-date rekey information at group member devices 154 that transmitted negative acknowledgement messages 190, the rekey server 153 designates such group member devices 154 as members of a unicast group, thus enabling the subsequent transmittal and receipt of a unicast rekey data message 185 (e.g., at group member device 154-3).

In step 213, the rekey distribution process 150-2, upon determining that a time for a response has elapsed from when the key server 153 transmitted the multicast probe message 160, designates each group member device 154 that the key server 153 did not receive an acknowledgement message 170 from as a member of a unicast group. Generally, as in one example embodiment, the key server 153 waits a predetermined amount of time after sending the multicast probe message 160 and, upon the lapse of the predetermined amount of time, the rekey server 153 assumes that those group member devices 154 that did not respond to the multicast probe message 160 are not capable of receiving multicast data. Thus, the rekey server 153 designates the non-responsive group member devices 154 as members of a unicast group. For example, assume that the rekey server 153 in FIG. 1 did not receive an acknowledgement message 170 from group member device 154-3 after a predetermined amount of time has elapsed (and, for that matter, did not receive a negative acknowledgement message 190 from group member device 154-3). As a result, the rekey server 153 designates group member device 154-3 as a member of the unicast group enabling the subsequent receipt of a unicast rekey data message 185 at group member device 154-3.

Figure 4:
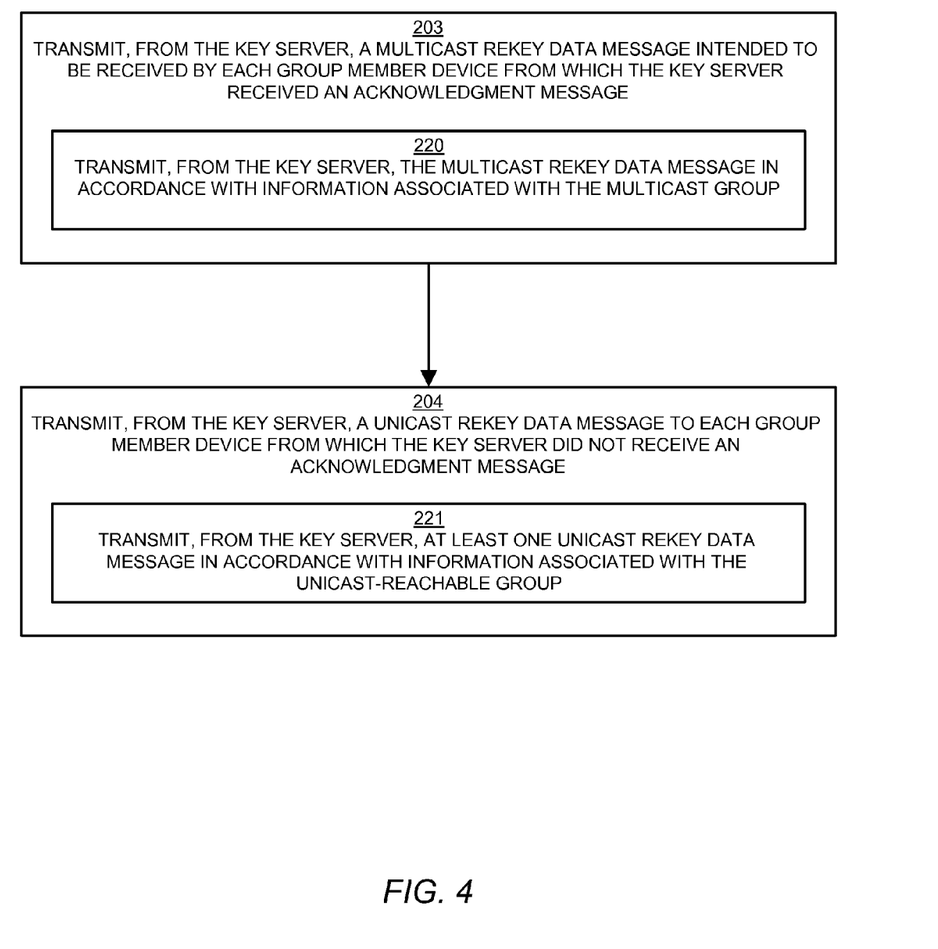
FIG. 4 is a flow chart of processing steps that shows high-level processing operations performed by the rekey distribution process 150-2 when it distributes rekey data in a VPN environment in accordance with one example configuration.

FIG. 4 is a flow chart of processing steps that shows high-level processing operations performed by the rekey distribution process 150-2 when it distributes rekey data in a VPN environment in accordance with one example configuration.

In step 220, the rekey distribution process 150-2 transmits, from the key server 153, the multicast rekey data message 180 in accordance with information associated with the multicast group. For example, in one embodiment the information associated with the multicast group comprises the Internet Protocol (IP) addresses of the group member devices 154 from which the rekey server 153 received an acknowledgement message 170.

In step 221, the rekey distribution process 150-2 transmits, from the key server, at least one unicast rekey data message 185 in accordance with information associated with the unicast group. For example, in one embodiment the information associated with the unicast group comprises at least one IP address of a group member device 154 from which the rekey server 153 did not receive an acknowledgement message 170. In an alternate embodiment, the information associated with the unicast group comprises at least one IP address of a group member device 154 from which the rekey server 153 received a negative acknowledgement message 190.

Figure 5:
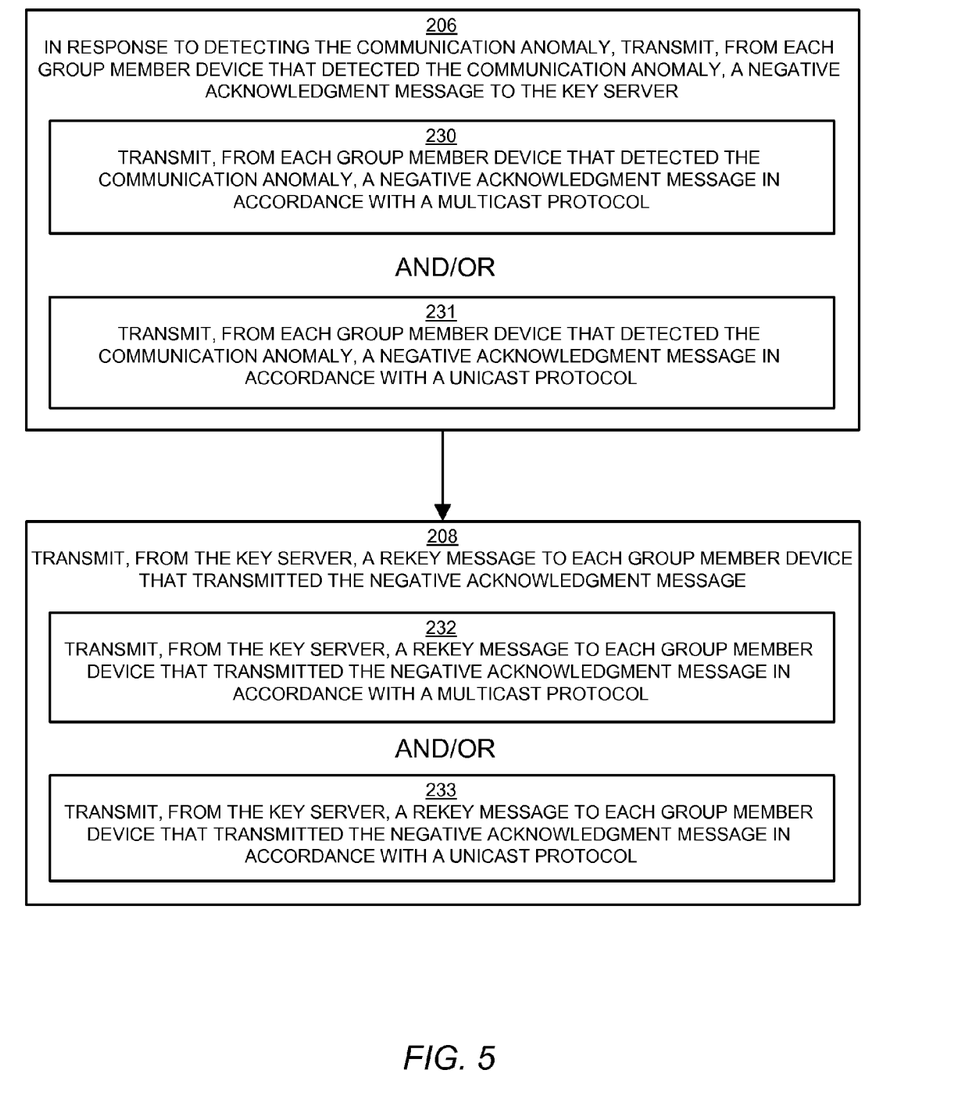
FIG. 5 is a flow chart of processing steps that shows high-level processing operations performed by the rekey distribution process 150-2 when it distributes rekey data in a VPN environment in accordance with one example configuration.

FIG. 5 is a flow chart of processing steps that shows high-level processing operations performed by the rekey distribution process 150-2 when it distributes rekey data in a VPN environment in accordance with one example configuration.

In step 230, the rekey distribution process 150-2 transmits, from each group member device 154 that detected the communication anomaly 189, a negative acknowledgment message 190 in accordance with a multicast protocol. In reference to the example embodiment depicted in FIG. 1, group member device 154-3 may transmit the negative acknowledgement message 190 (e.g., in response to a communication anomaly 189) to the rekey server 153 via a multicast protocol.

In step 231, the rekey distribution process 150-2 transmits, from each group member device that detected the communication anomaly 189, a negative acknowledgment message 190 in accordance with a unicast protocol. As per the example embodiment shown in FIG. 1, group member device 154-3 may transmit the negative acknowledgement message 190 (e.g., in response to a communication anomaly 189) to rekey server 153 via a unicast protocol.

In step 232, the rekey distribution process 150-2 transmits, from the key server 153, a rekey message 195 to each group member device 154 that transmitted the negative acknowledgment message 190 in accordance with a multicast protocol. Referring to the example embodiment depicted in FIG. 1, the rekey server 153 may transmit the rekey message 195 to group member device 154-3 via a multicast protocol.

In step 233, the rekey distribution process 150-2 transmits, from the key server 153, a rekey message 195 to each group member device 154 that transmitted the negative acknowledgment message 190 in accordance with a unicast protocol. As per the example embodiment depicted in FIG. 1, the rekey server 153 may transmit the rekey message 195 to group member device 154-3 via a unicast protocol.

Figure 6:
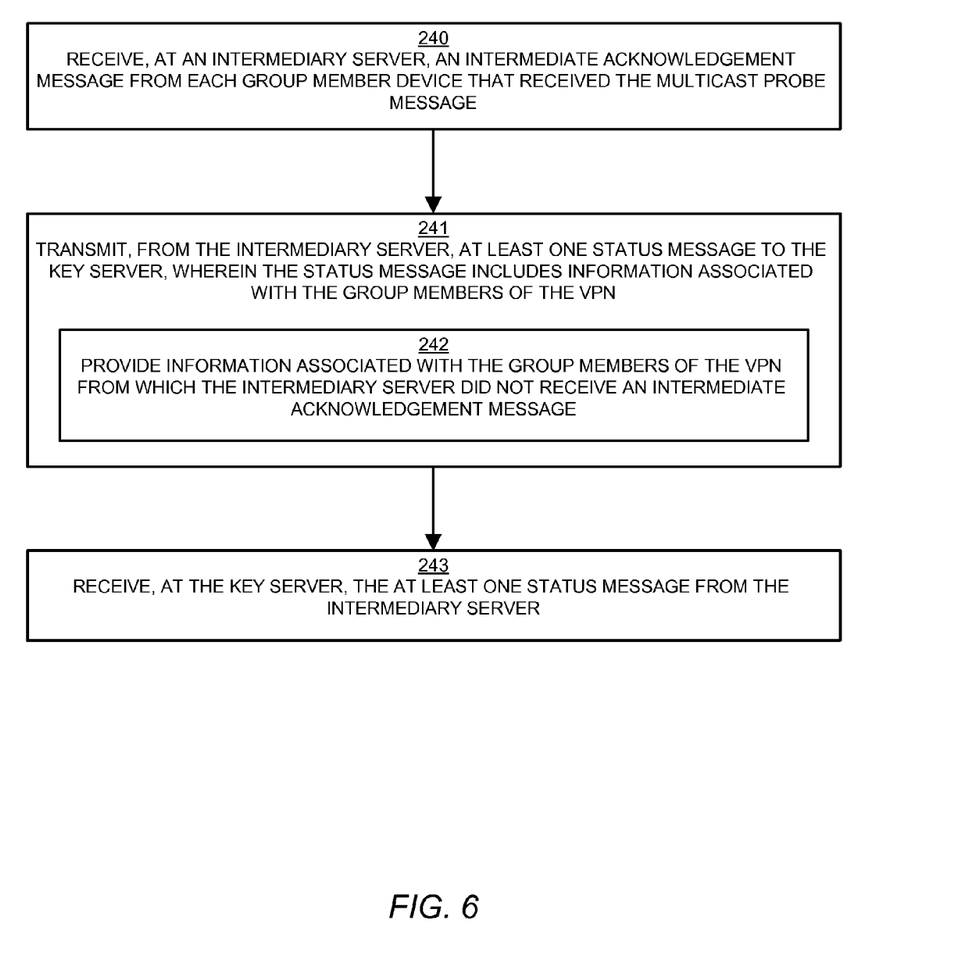
FIG. 6 is a flow chart of processing steps that shows high-level processing operations performed by the rekey distribution process 150-2 when it distributes rekey data in a VPN environment in accordance with one example configuration.

FIG. 6 is a flow chart of processing steps that shows high-level processing operations performed by the rekey distribution process 150-2 when it distributes rekey data in a VPN environment in accordance with one example configuration.

In step 240, the rekey distribution process 150-2 receives, at an intermediary server 155, an intermediate acknowledgement message 196 from each group member device 154 that received the multicast probe message 160. The intermediate server 155 acts as a buffer between the group member devices 154 of the VPN environment 151 and the key server 153 so as to ease to the load of acknowledgement messages 170 that the key server would receive in response to the multicast probe message 160. In an alternate embodiment which typically involves numerous group member 154 devices associated with the VPN environment 151, multiple intermediary server devices 155 are utilized to handle rekey data traffic for various sets of group member devices 154 within the VPN environment 151. In the example embodiment of FIG. 1, the intermediary server 155 receives intermediate acknowledgement messages 196 from group member devices 154-1 and 154-2 in response to the multicast probe message 160 sent by the rekey server 153.

In step 241, the rekey distribution process 150-2 transmits, from the intermediary server 155, at least one status message 197 to the key server 153, wherein the status message 197 includes information associated with the group member devices 154 of the VPN environment 151. In accordance with one example embodiment, the status message 197 includes the IP addresses of the group member devices 154 from which the intermediary server 155 received an intermediate acknowledgement message 196. Referencing the example embodiment shown in FIG. 1, the intermediary server 155 transmits a status message 197 to the key server 153 (e.g., via VPN network cloud 152) containing the IP addresses of group member devices 154-1 and 154-2 (the group member devices in which the intermediary server 155 received an intermediate acknowledgement message 196 from).

In step 242, the rekey distribution process 150-2 provides information associated with the group member devices 154 (e.g., via a status message 197) of the VPN environment 151 from which the intermediary server 155 did not receive an intermediate acknowledgement message 196. In the example embodiment of FIG. 1, the intermediary server 155 transmits a status message 197 to the rekey server 153 containing the IP address of group member device 154-3 (assuming, for this example, that group member device 154-3 did not send an intermediate acknowledge message 196 to the intermediary server 155 in response to the multicast probe message 160). It should be noted that the status message may include information associated with group member devices 154 that both transmitted and did not transmit an intermediate acknowledgement message 196 (e.g., the status message may contain IP addresses for group member devices 154-1, 154-2 and 154-3). In an alternate embodiment, the intermediary server 155 may also receive negative acknowledgement messages 190 from group member devices 154 that detect a communication anomaly as previously discussed.

In step 243, the rekey distribution process 150-2 receives, at the key server 153, the at least one status message 197 from the intermediary server 155. With the information contained within the status message 197 (e.g., IP addresses of those group member devices 154 that did not respond to the multicast probe message with an intermediate acknowledgement message 196), the rekey server 153 may marshal group member devices 153 into multicast and unicast group for the subsequent distribution of rekey information (e.g., via multicast rekey data messages 180 and unicast rekey data messages 185).

Figure 7:
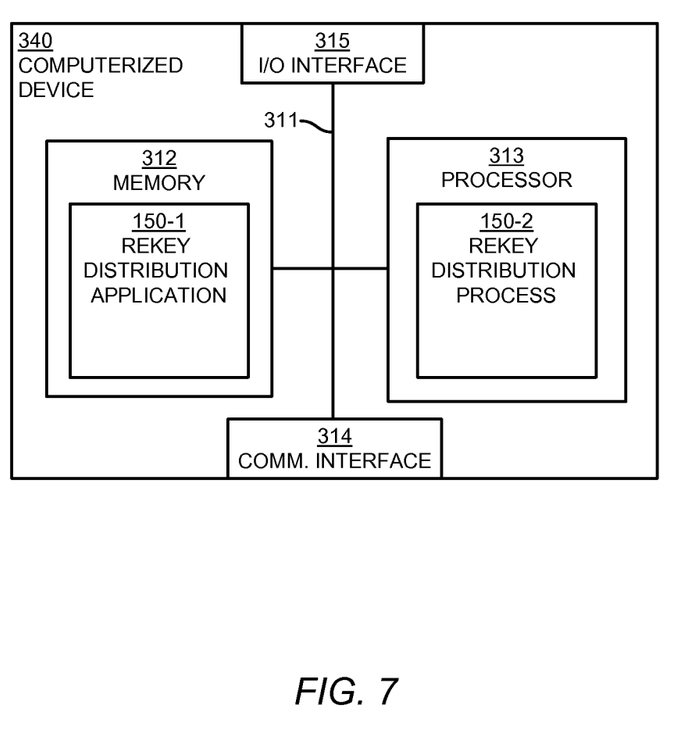
FIG. 7 is a block diagram of a computerized system configured with an application including a rekey distribution process in accordance with one example configuration

FIG. 7 illustrates example architectures of a computer device that is configured as a computer system 340. The computerized device 340 may be any type of computerized system such as a personal computer, workstation, portable computing device, mainframe, server or the like. In this example, the system includes an interconnection mechanism 311 that couples a memory system 312, a processor 313, a communications interface 314, and an I/O interface 315. The communications interface 314 and I/O interface 315 allow the computer system 340 to communicate with external devices or systems.

The memory system 312 may be any type of computer readable medium that is encoded with a rekey distribution application 150-1 that represents software code such as data and/or logic instructions (e.g., stored in the memory or on another computer readable medium such as a disk) that embody the processing functionality of embodiments of the invention for the rekey distribution process 150-2 as explained above. The processor 313 can access the memory system 312 via the interconnection mechanism 311 in order to launch, run, execute, interpret or otherwise perform the logic instructions of the applications 150-1 for the host in order to produce a corresponding rekey distribution process 150-2. In other words, the rekey distribution process 150-2 represents one or more portions of the rekey distribution application 150-1 performing within or upon the processor 313 in the computer system.

It is noted that example configurations disclosed herein include the rekey distribution application 150-1 itself (i.e., in the form of un-executed or non-performing logic instructions and/or data). The rekey distribution application 150-1 may be stored on a computer readable medium (such as a floppy disk), hard disk, electronic, magnetic, optical or other computer readable medium. The rekey distribution application 150-1 may also be stored in a memory system 112 such as in firmware, read only memory (ROM), or, as in this example, as executable code in, for example, Random Access Memory (RAM). In addition to these embodiments, it should also be noted that other embodiments herein include the execution of the rekey distribution application 150-1 in the processor 113 as the rekey distribution process 150-2. In another alternative configuration, the rekey distribution process 150-2 may be embedded in the operating system or may operate as a separate process from the application and may track all user input or only some user input (such as mouse movement or clicks, but not keyboard input). Those skilled in the art will understand that the computer system 110 may include other processes and/or software and hardware components, such as an operating system not shown in this example.

While this invention has been particularly shown and described with references to preferred embodiments thereof, it will be understood by those skilled in the art that various changes in form and details may be made therein without departing from the spirit and scope of the present application as defined by the appended claims. Such variations are covered by the scope of this present disclosure. As such, the foregoing description of embodiments of the present application is not intended to be limiting. Rather, any limitations to the invention are presented in the following claims. Note that the different embodiments disclosed herein can be combined or utilized individually with respect to each other.

What we claim is:

1. A method comprising:
   distributing Virtual Private Network (VPN) rekey data from a VPN key server to a plurality of VPN group members using both multicast and unicast rekey messages;
   transmitting, from the VPN key server, a multicast probe message intended to be received by at least one VPN group member device;
   wherein the multicast probe message is sent to determine whether a multicast tree is set up and ascertain group member devices that are capable of receiving multicast messages;
   receiving, at the VPN key server, an acknowledgement message from each VPN group member device that received the multicast probe message and designating, at the VPN key server, each VPN group member device that transmitted the acknowledgment message as a member of a multicast-reachable group;
   upon determining that a time for a response has elapsed from when the VPN key server transmitted the multicast probe message, designating each VPN group member that the key server did not receive an acknowledgement message from as a member of a unicast-reachable group;
   transmitting, from the VPN key server, a multicast rekey data message containing the VPN rekey data and intended to be received only by each VPN group member device from which the VPN key server received an acknowledgment message to the multicast probe message; and
   transmitting, from the VPN key server, a unicast rekey data message containing the VPN rekey data only to each VPN group member device from which the VPN key server did not receive an acknowledgment message to the multicast probe message;
   wherein the distributing the VPN rekey data is performed by one or more processors.

2. The method of claim 1 wherein the transmitting, from the VPN key server, a multicast rekey data message intended to be received by each VPN group member device that the key server received an acknowledgment message from comprises:
   transmitting, from the VPN key server, the multicast rekey data message in accordance with information associated with a multicast-capable group; and
   wherein the transmitting, from the VPN key server, a unicast rekey data message to each VPN group member device that the VPN key server did not receive an acknowledgment message from comprises:
   transmitting, from the VPN key server, at least one unicast rekey data message in accordance with information associated with a unicast-capable group.

3. The method of claim 1 further comprising:
   receiving, at the VPN key server, at least one status message from an intermediary server containing information associated with one or more VPN group member devices from which the intermediary server received an intermediate acknowledgement message to the multicast probe message.

4. The method of claim 3 wherein the receiving, at the VPN key server, at least one status message from an intermediary server comprises:
   receiving information associated with VPN group member devices from which the intermediary server did not receive an intermediate acknowledgement message.

5. A computerized device comprising:
   a memory;
   a processor;
   a communications interface;
   an interconnection mechanism coupling the memory, the processor and the communications interface;
   wherein the memory is encoded with a rekey distribution application that when executed on the processor provides a rekey distribution process causing the computerized device to be capable of performing the operations of:
   distributing Virtual Private Network (VPN) rekey data from a VPN key server to a plurality of VPN group members using both multicast and unicast rekey messages;
   transmitting, from the VPN key server, a multicast probe message intended to be received by at least one VPN group member device;
   wherein the multicast probe message is sent to determine whether a multicast tree is set up and ascertain group member devices that are capable of receiving multicast messages;
   receiving, at the VPN key server, an acknowledgement message from each VPN group member device that received the multicast probe message and designating, at the VPN key server, each VPN group member device that transmitted the acknowledgment message as a member of a multicast-reachable group;
   upon determining that a time for a response has elapsed from when the VPN key server transmitted the multicast probe message, designating each VPN group member that the key server did not receive an acknowledgement message from as a member of a unicast-reachable group;

transmitting, from the VPN key server, a multicast rekey data message containing the VPN rekey data and intended to be received only by each VPN group member device from which the VPN key server received an acknowledgment message to the multicast probe message; and transmitting, from the VPN key server, a unicast rekey data message containing the VPN rekey data only to each VPN group member device from which the VPN key server did not receive an acknowledgment message to the multicast probe message.

6. The computerized device of claim 5 wherein the transmitting, from the VPN key server, a multicast rekey data message intended to be received by each VPN group member device that the VPN key server received an acknowledgment message from comprises:

transmitting, from the VPN key server, at least one rekey data message in accordance with information associated with the multicast-reachable group; and wherein the transmitting, from the VPN key server, a unicast rekey data message to each group member device that the VPN key server did not receive an acknowledgment message from comprises:

transmitting, from the VPN key server, at least one unicast rekey data message in accordance with information associated with the unicast-reachable group.

7. The computerized device of claim 5 further comprising:

receiving, at the VPN key server, at least one status message from an intermediary server containing information associated with one or more VPN group member devices from which the intermediary server received an intermediate acknowledgement message to the multicast probe message.

8. The computerized device of claim 7 wherein the receiving, at the VPN server, at least one status message from an intermediary server comprises:

receiving information associated with VPN group member devices from which the intermediary server did not receive an intermediate acknowledgement message to the multicast probe message.

9. A non-transitory computer-readable storage medium storing one or more sequences of instructions that, when executed by one or more processors, causes the processors to perform:

distributing Virtual Private Network (VPN) rekey data from a VPN key server to a plurality of VPN group members using both multicast and unicast rekey messages;

transmitting, from the VPN key server, a multicast probe message intended to be received by at least one VPN group member device;

wherein the multicast probe message is sent to determine whether a multicast tree is set up and ascertain group member devices that are capable of receiving multicast messages;

receiving, at the VPN key server, an acknowledgement message from each VPN group member device that received the multicast probe message and designating, at the VPN key server, each VPN group member device that transmitted the acknowledgment message as a member of a multicast-reachable group;

upon determining that a time for a response has elapsed from when the VPN key server transmitted the multicast probe message, designating each VPN group member that the key server did not receive an acknowledgement message from as a member of a unicast-reachable group;

transmitting, from the VPN key server, a multicast rekey data message containing the VPN rekey data and intended to be received only by each VPN group member device from which the VPN key server received an acknowledgment message to the multicast probe message; and transmitting, from the VPN key server, a unicast rekey data message containing the VPN rekey data only to each VPN group member device from which the VPN key server did not receive an acknowledgment message to the multicast probe message.

10. The computer-readable storage medium of claim 9, wherein the instructions comprise instructions that cause receiving, at the VPN key server, at least one status message from an intermediary server containing information associated with one or more VPN group member devices from which the intermediary server received an intermediate acknowledgement message to the multicast probe message.

11. The computer-readable storage medium of claim 10, wherein the instructions that cause receiving, at the VPN key server, at least one status message from an intermediary server comprise instructions that cause:

receiving information associated with VPN group member devices from which the intermediary server did not receive an intermediate acknowledgement message.

* * * * *

UNITED STATES PATENT AND TRADEMARK OFFICE
CERTIFICATE OF CORRECTION

| | |
|---|---|
| PATENT NO. | : 8,515,079 B1 |
| APPLICATION NO. | : 11/627637 |
| DATED | : August 20, 2013 |
| INVENTOR(S) | : Rajiv Asati et al. |

It is certified that error appears in the above-identified patent and that said Letters Patent is hereby corrected as shown below:

In the claims:

COLUMN 9

Claim 1 line 60 delete "an" insert -- the --
Claim 1 line 65 delete "an" insert -- the --

COLUMN 10

Claim 1 line 4 delete "an" insert -- the --
Claim 2 line 11 delete "an" insert -- the --
Claim 2 line 19 delete "an" insert -- the --
Claim 3 line 28 delete "an" insert -- the --

COLUMN 11

Claim 5 line 1 delete "an" insert -- the --
Claim 5 line 12 delete "an" insert -- the --
Claim 6 line 17 delete "an" insert -- the --
Claim 6 line 25 delete "an" insert -- the --
Claim 8 line 42 delete "an" insert -- the --

COLUMN 12

Claim 9 line 20 delete "an" insert -- the --
Claim 9 line 25 delete "an" insert -- the --
Claim 9 line 31 delete "an" insert -- the --
Claim 11 line 46 delete "an" insert -- the --

Signed and Sealed this
Nineteenth Day of November, 2013

Teresa Stanek Rea
*Deputy Director of the United States Patent and Trademark Office*